United States Patent
Howard, Jr. et al.

(10) Patent No.: US 11,548,453 B2
(45) Date of Patent: Jan. 10, 2023

(54) SPLIT ROOF LINING AND DATUM SCHEME

(71) Applicant: Honda Motor Co., Ltd., Tokyo (JP)

(72) Inventors: John F. Howard, Jr., Marysville, OH (US); Yuze Li, Troy, MI (US); Akira Miyazaki, Birmingham, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 17/201,124

(22) Filed: Mar. 15, 2021

(65) Prior Publication Data
US 2022/0289123 A1  Sep. 15, 2022

(51) Int. Cl.
*B60R 13/02* (2006.01)
*B62D 65/02* (2006.01)
*B62D 25/06* (2006.01)
*B60Q 3/51* (2017.01)

(52) U.S. Cl.
CPC ............ *B60R 13/0212* (2013.01); *B60Q 3/51* (2017.02); *B62D 25/06* (2013.01); *B62D 65/02* (2013.01)

(58) Field of Classification Search
CPC ............ B60R 13/0206; B60R 13/0212; B60R 13/0231; B60R 11/0003; B60R 2011/0028; B60R 2013/0293; B62D 25/06; B62D 65/02; B60Q 3/51
USPC ....................................................... 296/214
See application file for complete search history.

(56) References Cited

U.S. PATENT DOCUMENTS

| | | | |
|---|---|---|---|
| 2003/0098595 A1* | 5/2003 | Carter | B60J 10/30 296/211 |
| 2004/0061358 A1* | 4/2004 | Vishey | B32B 5/28 296/214 |
| 2004/0239151 A1* | 12/2004 | Czinki | B60R 13/025 296/214 |
| 2005/0029837 A1* | 2/2005 | Stehning | B60R 13/0218 296/214 |
| 2008/0272622 A1* | 11/2008 | Zarewych | B60R 13/0225 296/214 |

(Continued)

FOREIGN PATENT DOCUMENTS

EP   2325053 A1 *  5/2011 ......... B60R 13/0225

OTHER PUBLICATIONS

Budinsky, "Head liner for a vehicle", May 25, 2011, Publisher European Patent Office, Edition: EP2325053A1 (Year: 2011).*

*Primary Examiner* — Dennis H Pedder
*Assistant Examiner* — Joyce Eileen Hill
(74) *Attorney, Agent, or Firm* — Mark E. Duell; Rankin, Hill & Clark LLP

(57) ABSTRACT

A split roof lining and datum scheme includes first, second and third roof lining assemblies. The first and second roof lining assemblies are aligned and directly connected to a roof installation of a vehicle using alignment features mated with datums in the roof installation. The third roof lining assembly is aligned and directly connected with the first and second roof lining assemblies using alignment features mated with datums in the first and second roof lining assemblies. The third roof lining assembly is not directly connected to the roof installation. Cover assemblies, optionally including light sources, cover interfaces between the first and third roof lining assemblies and between the second and third roof lining assemblies.

20 Claims, 4 Drawing Sheets

(56) References Cited

U.S. PATENT DOCUMENTS

| | | | |
|---|---|---|---|
| 2013/0285419 A1* | 10/2013 | Lizak | B60R 13/0212 |
| | | | 296/214 |
| 2020/0062195 A1* | 2/2020 | Forgette | B60R 13/0206 |
| 2020/0108698 A1 | 4/2020 | Sakurai | |

* cited by examiner

SPLIT ROOF LINING AND DATUM SCHEME

BACKGROUND

A roof lining covers an interior surface of a roof of a vehicle. Such a roof lining can be of a single piece or a multi-piece construction. In multi-piece roof linings, a joint between the multiple pieces may run a full width of the vehicle and is visible to occupants of the vehicle.

BRIEF DESCRIPTION

According to one aspect, a multi-piece roof liner configured to connect to a roof installation of a vehicle includes a first roof lining assembly including a first alignment feature configured to mate with a first datum in the roof installation and thereby align the first roof lining assembly with the roof installation; a second roof lining assembly including a second alignment feature configured to mate with a second datum in the roof installation and thereby align the second roof lining assembly with the roof installation; and a third roof lining assembly including a third alignment feature configured to mate with a third datum in the first roof lining assembly and thereby align the third roof lining assembly with the first roof lining assembly, and a fourth alignment feature configured to mate with a fourth datum in the second roof lining assembly and thereby align the third roof lining assembly with the second roof lining assembly.

According to another aspect, a method of installing a multi-piece roof lining on a vehicle includes aligning a first roof lining assembly to a roof installation of the vehicle by mating a first alignment feature of the first roof lining assembly with a first datum on the roof installation, and connecting the first roof lining assembly to the roof installation; aligning a second roof lining assembly to the roof installation by mating a second alignment feature of the second roof lining assembly with a second datum on the roof installation, and connecting the second roof lining assembly to the roof installation; and after aligning and connecting the first roof lining assembly and the second roof lining assembly to the roof installation, aligning a third roof lining assembly to the first roof lining assembly and the second roof lining assembly by mating a third alignment feature of the third roof lining assembly with a third datum on the first roof lining assembly and mating a fourth alignment feature of the third roof lining assembly with a fourth datum on the second roof lining assembly, and directly connecting the third roof lining assembly to the first roof lining assembly and the second roof lining assembly.

DETAILED DESCRIPTION

Figure 1:
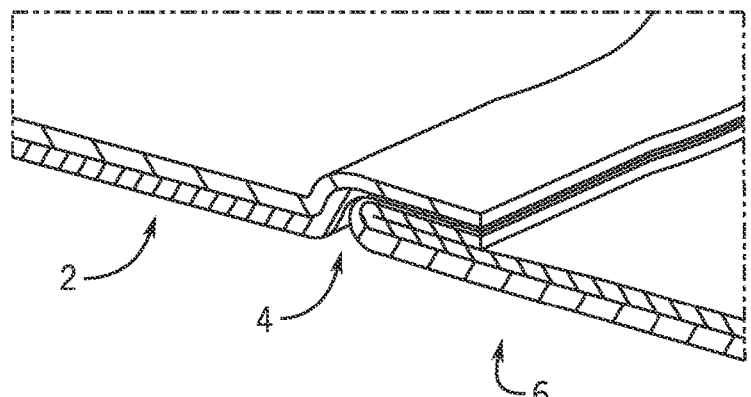
FIG. 1 is a perspective view of a known seam between two sections of a roof lining.

It should, of course, be understood that the description and drawings herein are merely illustrative and that various modifications and changes can be made in the structures disclosed without departing from the present disclosure. Referring now to FIG. 1, a known multi-piece roof lining includes a first roof lining section 2 connected at a seam 4 with a second roof lining section 6. The seam 4 is not covered and is thus visible to occupants of a vehicle.

Figure 2:
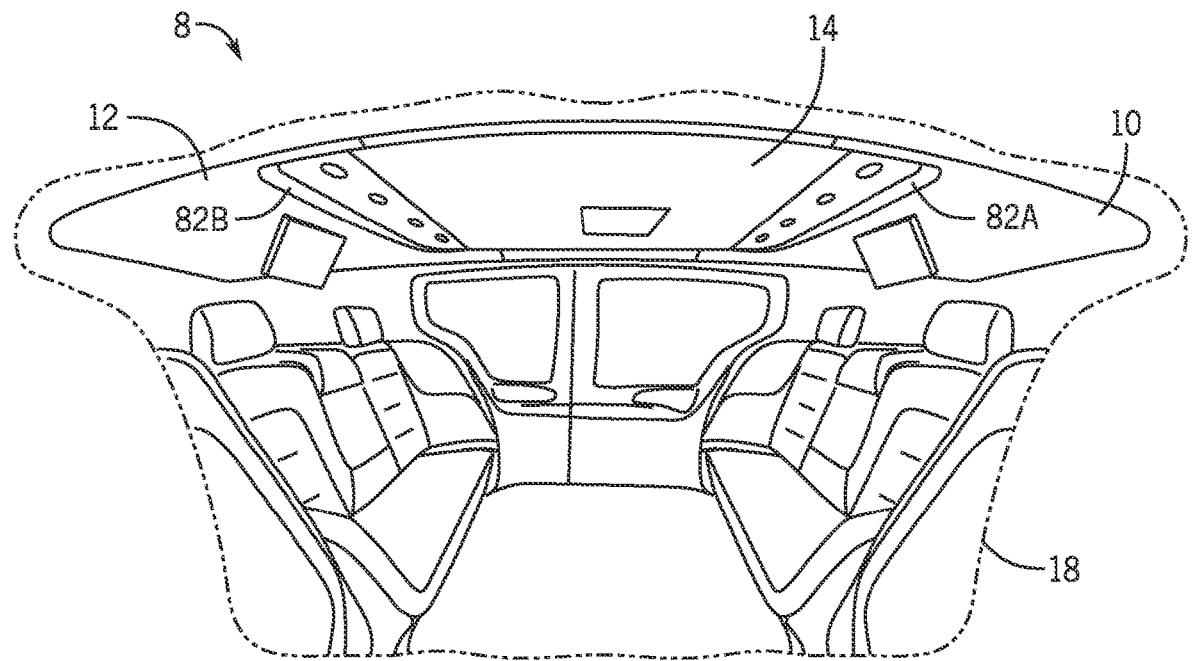
FIG. 2 is a perspective view of an interior of a vehicle including a split roof lining according to the present subject matter.
Figure 3:
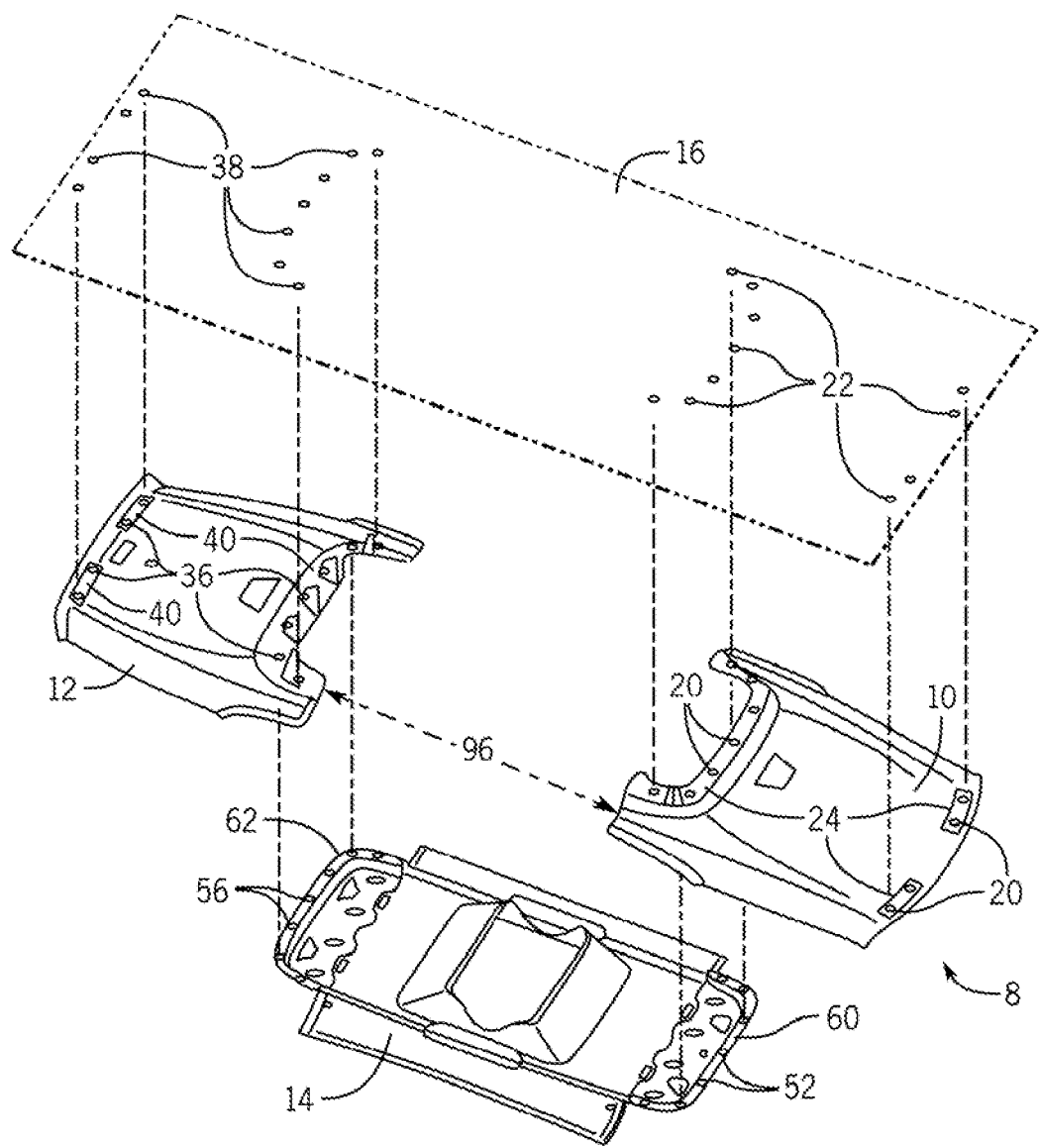
FIG. 3 is a perspective view of an installation of a split roof lining according to the present subject matter.

With reference to FIGS. 2 and 3, a split roof liner 8 (also referred to as "multi-piece roof liner") according to the present disclosure includes a first roof lining assembly 10, a second roof lining assembly 12, and a third roof lining assembly 14. The split roof liner 8 is configured to connect to a roof installation 16 of a vehicle 18. When connected to the roof installation 16, the first roof lining assembly 10 may be arranged at a front of the vehicle 18; the second roof lining assembly 12 may be arranged at a rear of the vehicle 18 and may not contact the first roof lining assembly 10; and the third roof lining assembly 14 may be arranged between the first and second roof lining assemblies 10, 12 and fill a gap 96 therebetween. It should be appreciated that the terms "front" and "rear" are relative to a driving direction of the vehicle 18.

The vehicle 18 is not particularly limited, and may include an operator-driven vehicle or an autonomously-driven vehicle. The roof installation 16 is not particularly limited, and may include a roof frame member of the vehicle 18, a roof panel, or other component of the roof of the vehicle 18.

In a non-limiting embodiment, the first roof lining assembly 10 and second roof lining assembly 12 are configured to connect to the roof installation 16, either directly to the roof installation 16 or indirectly to the roof installation 16 via an intervening element. As used herein, "directly connected" or cognate terms/phrases means that the two referenced elements are connected to each other with no intervening elements arranged between them, and "indirectly connects" means that the two referenced elements are connected to each other with one or more intervening elements arranged between them. The third roof lining assembly 14 is configured to directly connect only to the first and second roof lining assemblies 10, 12 and thus only indirectly connect to the roof installation 16 by directly connecting to the first and second roof lining assemblies 10, 12, which themselves are directly connected to the roof installation 16. In other words, the third roof lining assembly 14 does not directly connect to the roof installation 16. The third roof lining assembly 14 may therefore not include an alignment feature configured to mate with a datum of the roof installation 16. In another non-limiting embodiment, the third roof lining assembly 14 is directly connected to the roof installation 16.

1. First Roof Lining Assembly

The first roof lining assembly 10 includes first alignment features 20 that are configured to mate with first datums 22 of the roof installation 16. The first alignment features 20 and the first datums 22 are configured such that when the first alignment features 20 are mated with the first datums 22, the first roof lining assembly 10 is properly aligned with the roof installation 16 in a desired configuration.

The first alignment features 20 and the first datums 22 may operate only to align the first roof lining assembly 10 with the roof installation 16, and optionally may also operate to connect the first roof lining assembly 10 with the roof installation 16. If the first alignment features 20 and the first datums 22 operate only to align the first roof lining assembly 10 with the roof installation 16, then fasteners, which are separate and distinct from the first alignment features 20 and the first datums 22, may be used to connect the first roof lining assembly 10 to the roof installation 16.

Figure 4:
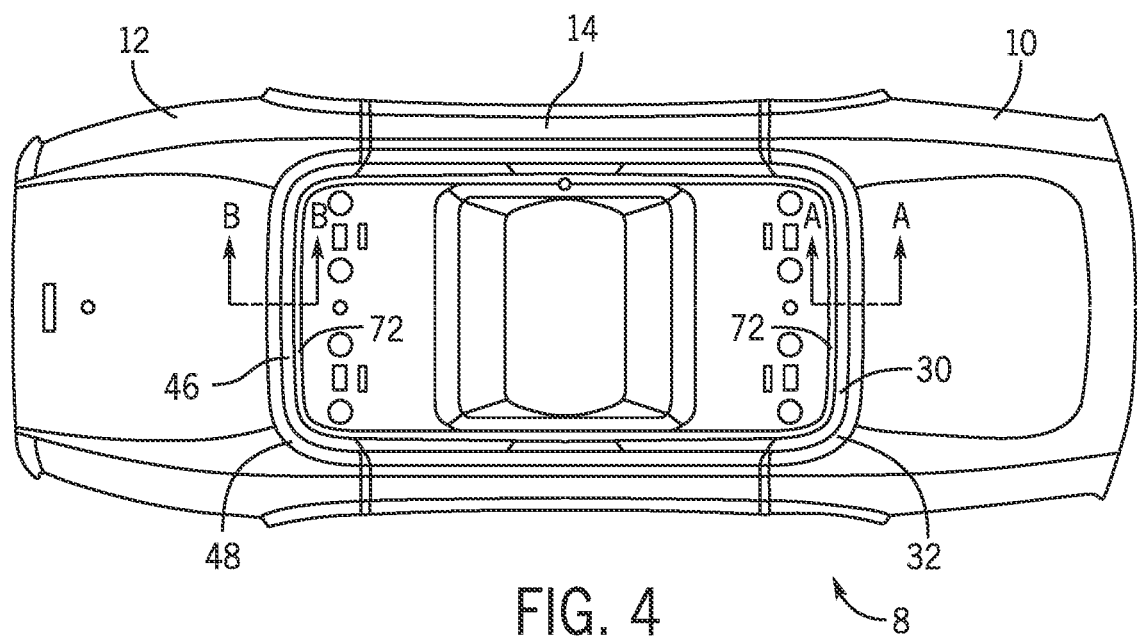
FIG. 4 is a top view of a split roof lining according to the present subject matter.

The first roof lining assembly 10 may connect to the roof installation 16 via connections made between the first alignment features 20 and the first datums 22. In a non-limiting aspect, the first alignment features 20 may include push-in fasteners (e.g. rivets, pins, clips, etc.) and the first datums 22 may include holes for accommodating the first alignment features 20. The first alignment features 20 together with the first datums 22 collectively operate to align and optionally secure the first roof lining assembly 10 to the roof installation 16. When the first alignment features 20 and the first datums 22 are mated, they not only properly align the first roof lining assembly 10 with the roof installation 16, but may also connect the first roof lining assembly 10 to the roof installation 16. This is shown schematically in FIGS. 3-4, where the first alignment features 20 are mated with the first datums 22.

Figure 5:
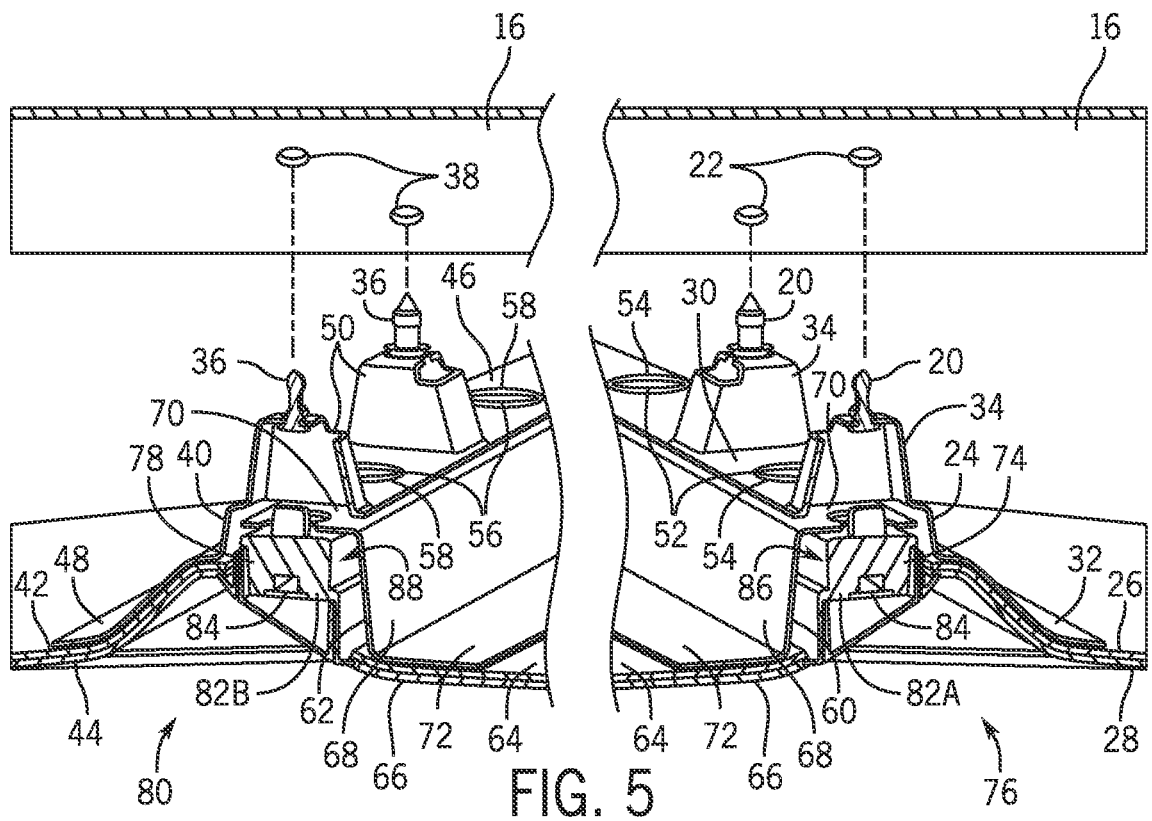
FIG. 5 is a sectional perspective view taken along lines A-A and B-B of the split roof lining of FIG. 4.

The first roof lining assembly 10 may include first connecting brackets 24, a first structural layer 26 connected to the first connecting brackets 24, and a first surface layer 28 covering the first structural layer 26. The first roof lining assembly 10 may include other layers and components. The first connecting brackets 24 include the first alignment features 20 (see FIGS. 3 and 5). The first connecting brackets 24 may each include a first base 30, a first flange 32 extending from the first base 30 and connected to the first structural layer 26, and first protrusions 34 extending up from the first base 30 and on top of which are arranged one of the first alignment features 20.

2. Second Roof Lining Assembly

The second roof lining assembly 12 includes second alignment features 36 that are configured to mate with second datums 38 of the roof installation 16. The second alignment features 36 and the second datums 38 are configured such that when the second alignment features 36 are mated with the second datums 38, the second roof lining assembly 12 is properly aligned with the roof installation 16 in a desired configuration.

The second alignment features 36 and the second datums 38 may operate only to align the second roof lining assembly 12 with the roof installation 16, and optionally may also operate to connect the second roof lining assembly 12 with the roof installation 16. If the second alignment features 36 and the second datums 38 operate only to align the second roof lining assembly 12 with the roof installation 16, then fasteners, which are separate and distinct from the second alignment features 36 and the second datums 38, may be used to connect the second roof lining assembly 12 to the roof installation 16.

The second roof lining assembly 12 may connect to the roof installation 16 via connections made between the second alignment features 36 and the second datums 38. In a non-limiting aspect, the second alignment features 36 may include push-in fasteners (e.g. rivets, pins, clips, etc.) and the second datums 38 may include holes for accommodating the second alignment features 36. The second alignment features 36 together with the second datums 38 collectively operate to align and optionally secure the second roof lining assembly 12 to the roof installation 16. When the second alignment features 36 and the second datums 38 are mated, they not only properly align the second roof lining assembly 12 with the roof installation 16, but may also connect the second roof lining assembly 12 to the roof installation 16. This is shown schematically in FIGS. 3-4, where the second alignment features 36 are mated with the second datums 38.

The second roof lining assembly 12 may include second connecting brackets 40, a second structural layer 42 connected to the second connecting brackets 40, and a second surface layer 44 covering the second structural layer 42. The second roof lining assembly 12 may include other layers and components. The second connecting brackets 40 include the second alignment features 36 (see FIGS. 3 and 5). The second connecting brackets 40 may each include a second base 46, a second flange portion 48 extending from the second base 46 and connected to the second structural layer 42, and second protrusions 50 extending up from the second base 46 and on top of which are arranged one of the second alignment features 36.

3. Third Roof Lining Assembly

The third roof lining assembly 14 includes third alignment features 52 that are configured to mate with third datums 54 on the first roof lining assembly 10, and fourth alignment features 56 configured to mate with fourth datums 58 on the second roof lining assembly 12. The third alignment features 52 and the third datums 54 are configured such that when the third alignment features 52 are mated with the third datums 54, the third roof lining assembly 14 is properly aligned with the first roof lining assembly 10 in a desired configuration. The fourth alignment features 56 and the fourth datums 58 are configured such that when the fourth alignment features 56 are mated with the fourth datums 58, the third roof lining assembly 14 is properly aligned with the second roof lining assembly 12 in a desired configuration. When the third roof lining assembly 14 is aligned with the first and second roof lining assemblies 10, 12, then the third roof lining assembly 14 is thus also properly aligned with the roof installation 16 in a desired configuration since the first and second roof lining assemblies 10, 12 are aligned with the roof installation 16.

The third and fourth alignment features 52, 56 and the corresponding third and fourth datums 54, 58 may operate only to align the third roof lining assembly 14 with the first and second roof lining assemblies 10, 12, and optionally may also operate to connect the third roof lining assembly 14 with the roof installation 16 first and second roof lining assemblies 10, 12. If the third and fourth alignment features 52, 56 and the corresponding third and fourth datums 54, 58 operate only to align the third roof lining assembly 14 with the first and second roof lining assemblies 10, 12, then fasteners, which are separate and distinct from the third and fourth alignment features 52, 56 and the corresponding third and fourth datums 54, 58, may be used to connect the third roof lining assembly 14 to the first and second roof lining assemblies 10, 12.

The third roof lining assembly 14 may connect to the first and second roof lining assemblies 10, 12 via connections made between the third and fourth alignment features 52, 56 and the corresponding third and fourth datums 54, 58 in the first and second connecting brackets 24, 40. In a non-limiting aspect, the third and fourth alignment features 52, 56 may include push-in fasteners (e.g. rivets, pins, clips, etc.) and the third and fourth datums 54, 58 may include holes in the respective bases 30, 46 for accommodating the third and fourth alignment features 52, 56. The third and fourth alignment features 52, 56 together with the third and fourth datums 54, 58 collectively operate to align and optionally secure the third roof lining assembly 14 with the first and second roof lining assemblies 10, 12. When the third and fourth alignment features 52, 56 and the respective third and fourth datums 54, 58 are mated, they not only operate to properly align the third roof lining assembly 14 with the first and second roof lining assemblies 10, 12, but also connect the third roof lining assembly 14 to the first and second roof lining assemblies 10, 12. This is shown schematically in FIGS. 3 and 5, where the third and fourth alignment features 52, 56 are mated with the respective third and fourth datums 54, 58.

The third roof lining assembly 14 may include a third connecting bracket 60, a fourth connecting bracket 62, a third structural layer 64 connected to the third and fourth connecting brackets 60, 62, and a third surface layer 66 covering the third structural layer 64. The third roof lining assembly 14 may include other layers and components. The third connecting bracket 60 includes the third alignment features 52, which are configured to mate with the third datums 54 in the first connecting bracket 24. The fourth connecting bracket 62 includes the fourth alignment features 56, which are configured to mate with the fourth datums 58 in the second connecting bracket 40. The third and fourth connecting brackets 60, 62 may each include a wall 68, a top flange 70 extending from a top of the wall 68 and a bottom flange 72 extending from a bottom of the wall 68. The top flange 70 of the third connecting bracket 60 may include the third alignment features 52, and the top flange 70 of the fourth connecting bracket 62 may include the fourth alignment features 56. The bottom flanges 72 of both the third and fourth connecting brackets 60, 62 may be connected to the third structural layer 64.

4. Cover Assembly

The split roof liner 8 may include a first cover assembly 74 for covering a first interface 76 between the first roof lining assembly 10 and the third roof lining assembly 14. The first cover assembly 74 may prevent an occupant from seeing the first interface 76. The first cover assembly 74 may connect to the third connecting bracket 60 and cover edges of each of the first surface layer 28 and the third surface layer 66 at the first interface 76 (See FIG. 5). The split roof liner 8 may include a second cover assembly 78 for covering a second interface 80 between the second roof lining assembly 12 and the third roof lining assembly 14. The second cover assembly 78 may prevent an occupant from seeing the second interface 80. The second cover assembly 78 may connect to the fourth connecting bracket 62 and cover edges of each of the second surface layer 44 and the third surface layer 66 at the second interface 80 (See FIG. 5). The first and second cover assemblies 74, 78 may each be a lighting assembly 82 including a light source 84 for emitting light from the first and second interfaces 76, 80. A first lighting assembly 82A may connect to the third connecting bracket 60 and may fit within a recess 86 defined by the third connecting bracket 60 and the first connecting bracket 24. A second lighting assembly 82B may connect to the fourth connecting bracket 62 and may fit within a recess 88 defined by the fourth connecting bracket 62 and the second connecting bracket 40. The recesses 86, 88 may house other electrical components.

5. Method

Figure 6:
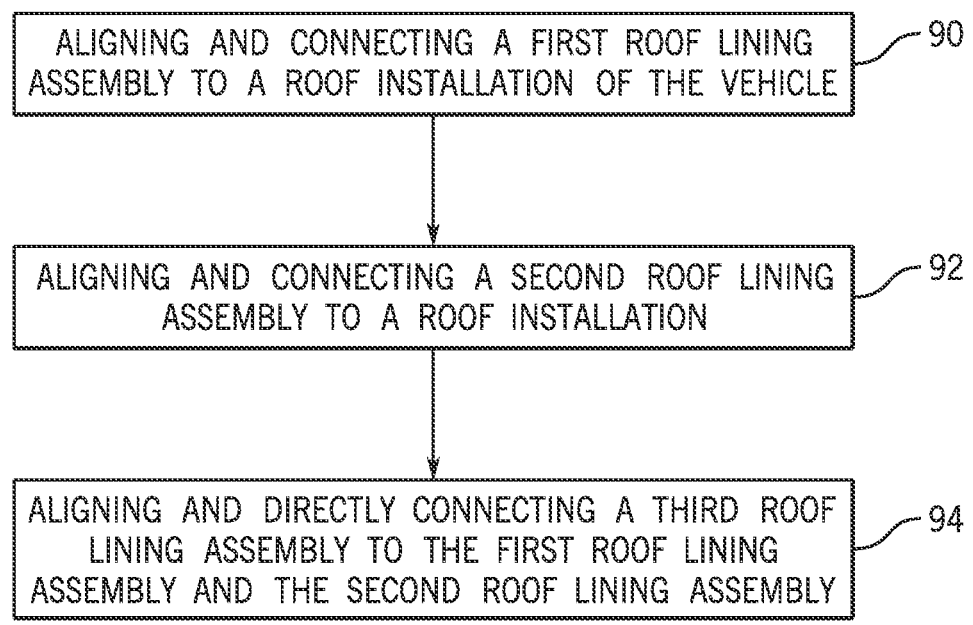
FIG. 6 is a flow diagram of a method of installing a split roof lining on a vehicle according to the present subject matter.

With reference to FIG. 6, a method of installing a multi-piece roof lining 8 on a vehicle 18 includes, at 90, aligning the first roof lining assembly 10 to the roof installation 16 of the vehicle 18. This may include mating a first alignment feature 20 of the first roof lining assembly 10 with a first datum 22 on the roof installation 16. When aligned, the first roof lining assembly 10 is connected to the roof installation 16, which may be accomplished by mating the first alignment feature 20 with the first datum 22. The first roof lining assembly 10 may be arranged at a front of the vehicle 18, although this is not required.

The method includes, at 92, aligning the second roof lining assembly 12 to the roof installation 16. This may include mating a second alignment feature 36 of the second roof lining assembly 12 with a second datum 38 on the roof installation 16. When aligned, the second roof lining assembly 12 is connected to the roof installation 16, which may be accomplished by mating the second alignment feature 36 with the second datum 38. The second roof lining assembly 12 may be arranged at a rear of the vehicle 18, opposite from the first roof lining assembly 10, although this is not required, and the second roof lining assembly 12 does not contact the first roof lining assembly 10 and they may have a gap between them.

The method includes, at 94, after aligning and connecting the first roof lining assembly 10 and the second roof lining assembly 12 to the roof installation 16, aligning the third roof lining assembly 14 to the first roof lining assembly 10 and the second roof lining assembly 12. This may include mating a third alignment feature 52 of the third roof lining assembly 14 with a third datum 54 on the first roof lining assembly 10, and mating a fourth alignment feature 56 of the third roof lining assembly 14 with a fourth datum 58 on the second roof lining assembly 12. When aligned, the third roof lining assembly 14 is directly connected to the first roof lining assembly 10 and the second roof lining assembly 12. The third roof lining assembly 14 may be arranged at a middle of the vehicle 18 (although this is not required), and is between the first roof lining assembly 10 and the second roof lining assembly 12, such that the third roof lining assembly 14 fills a gap between the first and second roof lining assemblies 10, 12.

The method may include connecting the first cover assembly 74 to the third roof lining assembly 14 to cover the first interface 76 between the first roof lining assembly 10 and the third roof lining assembly 14, and connecting the second cover assembly 78 to the third roof lining assembly 14 to cover the second interface 80 between the second roof lining assembly 12 and the third roof lining assembly 14. The first cover assembly 74 and the second cover assembly 78 may each include a lighting assembly 82 and light source 84.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-piece roof liner configured to connect to a roof installation of a vehicle, the liner including:
   a first roof lining assembly including a first alignment feature configured to mate with a first datum in the roof installation and thereby align the first roof lining assembly with the roof installation;
   a second roof lining assembly including a second alignment feature configured to mate with a second datum in the roof installation and thereby align the second roof lining assembly with the roof installation; and
   a third roof lining assembly including a third alignment feature configured to mate with a third datum in the first roof lining assembly and thereby align the third roof lining assembly with the first roof lining assembly, and a fourth alignment feature configured to mate with a fourth datum in the second roof lining assembly and thereby align the third roof lining assembly with the second roof lining assembly;

wherein the first roof lining assembly being aligned with the roof installation causes the third datum to be aligned for mating with the third alignment feature; and wherein the second roof lining assembly being aligned with the roof installation causes the fourth datum to be aligned for mating with the fourth alignment feature.

2. The multi-piece roof liner according to claim 1, wherein the third roof lining assembly is aligned with the roof installation by the first alignment feature being mated with the first datum, the second alignment feature being mated with the second datum, the third alignment feature being mated with the third datum, and the fourth alignment feature being mated with the fourth datum.

3. The multi-piece roof liner according to claim 1, wherein the first roof lining assembly is aligned with second roof lining assembly by the first alignment feature being mated with the first datum and the second alignment feature being mated with the second datum.

4. The multi-piece roof liner according to claim 1, wherein:
the first roof lining assembly and the second roof lining assembly are configured to directly connect to the roof installation; and
the third roof lining assembly is configured to directly connect to the first roof lining assembly and the second roof lining assembly.

5. The multi-piece roof liner according to claim 4, wherein the third roof lining assembly does not include an alignment feature configured to mate with a datum of the roof installation.

6. The multi-piece roof liner according to claim 1, wherein:
when the first roof lining assembly, the second roof lining assembly, and the third roof lining assembly are connected to the roof installation, the third roof lining assembly is arranged between the first roof lining assembly and the second roof lining assembly, and
the multi-piece roof liner further includes a first cover assembly that is configured to connect to the third roof lining assembly and cover a first interface between the first roof lining assembly and the third roof lining assembly, and a second cover assembly that is configured to connect to the third roof lining assembly and cover a second interface between the second roof lining assembly and the third roof lining assembly.

7. The multi-piece roof liner according to claim 6, wherein the first cover assembly and the second cover assembly each include a light source.

8. The multi-piece roof liner according to claim 1, wherein:
the first roof lining assembly includes a first connecting bracket including the first alignment feature and the third datum;
the second roof lining assembly includes a second connecting bracket including the second alignment feature and the fourth datum; and
the third roof lining assembly includes a third connecting bracket including the third alignment feature, and a fourth connecting bracket including the fourth alignment feature.

9. The multi-piece roof liner according to claim 8, wherein:
the first roof lining assembly includes a first structural layer attached to the first connecting bracket, and a first surface layer covering the first structural layer;

the second roof lining assembly includes a second structural layer attached to the second connecting bracket, and a second surface layer covering the second structural layer; and the third roof lining assembly includes a third structural layer attached to the third connecting bracket and the fourth connecting bracket, and a third surface layer covering the third structural layer.

10. The multi-piece roof liner according to claim 9, further including:
a first lighting assembly connected to the third connecting bracket and covering edges of each of the first surface layer and the third surface layer at a first interface between the first roof lining assembly and the third roof lining assembly; and
a second lighting assembly connected to the fourth connecting bracket and covering edges of each of the second surface layer and the third surface layer at a second interface between the second roof lining assembly and the third roof lining assembly.

11. A method of installing a multi-piece roof lining on a vehicle, comprising:
aligning a first roof lining assembly to a roof installation of the vehicle by mating a first alignment feature of the first roof lining assembly with a first datum on the roof installation, and connecting the first roof lining assembly to the roof installation;
aligning a second roof lining assembly to the roof installation by mating a second alignment feature of the second roof lining assembly with a second datum on the roof installation, and connecting the second roof lining assembly to the roof installation; and
after aligning and connecting the first roof lining assembly and the second roof lining assembly to the roof installation, aligning a third roof lining assembly to the first roof lining assembly and the second roof lining assembly by mating a third alignment feature of the third roof lining assembly with a third datum on the first roof lining assembly and mating a fourth alignment feature of the third roof lining assembly with a fourth datum on the second roof lining assembly, and directly connecting the third roof lining assembly to the first roof lining assembly and the second roof lining assembly.

12. The method according to claim 11, wherein the first roof lining assembly is connected towards a front of the vehicle, the second roof lining assembly is connected toward a rear of the vehicle, and the third roof lining assembly is arranged between the first roof lining assembly and the second roof lining assembly.

13. The method according to claim 12, wherein when connected to the roof installation, the first roof lining assembly and the second roof lining assembly do not contact each other, and the third roof lining assembly fills a gap between the first roof lining assembly and the second roof lining assembly.

14. The method according to claim 11, wherein the third roof lining assembly does not include an alignment feature configured to mate with a datum of the roof installation.

15. The method according to claim 11, further comprising:
connecting a first cover assembly to the third roof lining assembly to cover a first interface between the first roof lining assembly and the third roof lining assembly, and connecting a second cover assembly to the third roof lining assembly to cover a second interface between the second roof lining assembly and the third roof lining assembly.

16. The method according to claim 15, wherein the first cover assembly and the second cover assembly each include a lighting assembly.

17. The method according to claim 11, wherein:
the first roof lining assembly includes a first connecting bracket including the first alignment feature and the third datum;
the second roof lining assembly includes a second connecting bracket including the second alignment feature and the fourth datum; and
the third roof lining assembly includes a third connecting bracket including the third alignment feature, and a fourth connecting bracket including the fourth alignment feature.

18. The method according to claim 17, wherein:
the first roof lining assembly includes a first structural layer attached to the first connecting bracket, and a first surface layer covering the first structural layer;
the second roof lining assembly includes a second structural layer attached to the second connecting bracket, and a second surface layer covering the second structural layer; and
the third roof lining assembly includes a third structural layer attached to the third connecting bracket and the fourth connecting bracket, and a third surface layer covering the third structural layer.

19. The method according to claim 18, wherein:
the method further includes connecting a first lighting assembly to the third connecting bracket, and connecting a second lighting assembly to the fourth connecting bracket;
the first lighting assembly covers edges of each of the first surface layer and the third surface layer at a first interface between the first roof lining assembly and the third roof lining assembly; and
the second lighting assembly covers edges of each of the second surface layer and the third surface layer at a second interface between the second roof lining assembly and the third roof lining assembly.

20. The method according to claim 11, wherein:
the first alignment feature directly connects the first roof lining assembly to the roof installation;
the second alignment feature directly connects the second roof lining assembly to the roof installation;
the third alignment feature directly connects the third roof lining assembly to the first roof lining assembly; and
the fourth alignment feature directly connects the third roof lining assembly to the second roof lining assembly.

* * * * *